United States Patent [19]

Beckstead et al.

[11] Patent Number: 4,490,339
[45] Date of Patent: Dec. 25, 1984

[54] PROCESS FOR RECOVERING TUNGSTEN FROM $MOS_3/WS_3$ PRECIPITATES

[75] Inventors: Leo W. Beckstead; Robert F. Hogsett, both of Arvada, Colo.; Dennis E. Voelker, Ft. Madison, Iowa

[73] Assignee: Amax Inc., Greenwich, Conn.

[21] Appl. No.: 577,103

[22] Filed: Feb. 6, 1984

[51] Int. Cl.$^3$ .................. C01G 41/00; C01G 39/00
[52] U.S. Cl. ................................ 423/58; 423/55
[58] Field of Search ........................... 423/53, 55, 58

[56] References Cited

U.S. PATENT DOCUMENTS

| | | | |
|---|---|---|---|
| 2,339,888 | 1/1944 | Smith | 423/58 |
| 4,303,622 | 12/1981 | Huggins et al. | 423/55 |
| 4,303,623 | 12/1981 | Huggins et al. | 423/55 |
| 4,320,095 | 3/1982 | Yuatrini et al. | 423/53 |
| 4,353,878 | 10/1982 | Yuatrini et al. | 423/53 |

Primary Examiner—Herbert T. Carter
Attorney, Agent, or Firm—Michael A. Ciomek; Eugene J. Kalil

[57] ABSTRACT

A process is provided for recovering molybdenum and tungsten separately from a sulfide cake containing the same along with arsenic as an impurity. The process comprises dissolving essentially all of the tungsten and molybdenum values contained in the cake in a caustic solution containing at least about 5 but not more than about 6 moles of sodium hydroxide per mole of tungsten plus molybdenum contained in the cake, separating insoluble material from the resulting leach solution and then precipitating one metal value from the group consisting of molybdenum and tungsten preferentially from the other.

4 Claims, No Drawings

PROCESS FOR RECOVERING TUNGSTEN FROM MOS₃/WS₃ PRECIPITATES

The present invention is directed to the separate recovery of tungsten and of molybdenum from materials, such as sulfide precipitates, containing the same.

BACKGROUND OF THE INVENTION AND THE PRIOR ART

Scheelite and wolframite concentrates are processed to produce ammonium paratungstate (APT), a precursor for the production of commercially pure tungsten and tungsten compounds. As an initial step, metal values in the concentrates are solubilized by alkaline digestion with sodium hydroxide or sodium carbonate to form sodium tungstate solutions. Caustic digestion may be accomplished at atmospheric or superatmospheric pressure and at elevated temperature depending upon the nature of the feed concentrate. In one commercial operation, the solution resulting from alkaline dissolution of the feed ore was reported to contain 50 to 300 gpl tungsten, about 10 to 10,000 ppm molybdenum and metal impurities such as lead, copper, antimony, bismuth, zinc and arsenic, all of which can be wholly or partly coprecipitated with molybdenum trisulfide. Separation of molybdenum from such a solution by sulfide precipitation accordingly will give a precipitate which is quite small in volume as compared to the volume of the original ore.

It is known from U.S. Pat. No. 2,339,888 that tungsten and molybdenum values contained in a scheelite concentrate can be dissolved in aqueous sodium hydroxide at 130° C. to form a solution containing sodium tungstate and sodium molybdate and that molybdenum sulfide could be precipitated from the solution by adding sodium sulfide, heating to 70° C. and adjusting the solution pH to a pH between 3 and 5 with hydrochloric acid. U.S. Pat. No. 4,303,622 addresses the problem of treating sodium tungstate solution high in molybdenum such as might be generated from caustic digestion of low-grade wolframite sources. The process disclosed utilizes a two-stage sulfide precipitation with intermediate caustic dissolution of the initial molybdenum sulfide cake. U.S. Pat. No. 4,303,623 is directed to precipitation of molybdenum trisulfide from sodium tungstate solutions having a pH between about 8 and about 5 by adding sulfide in excess of the amount required to form sulfides with molybdenum and other sulfidizable species present and then rapidly acidifying the solution through the pH range of 5 to 4.5 to a final pH of 2.5. A tungsten solution very low in molybdenum is obtained.

Despite the multitudinous relevant teachings in the art as exemplified by the foregoing, it is still found that, in attempting to operate a commercial plant designed to treat concentrates containing mixed tungsten-molybdenum values, losses of tungsten to the molybdenum trisulfide cake were excessive. It was foreseen, also, that such tungsten losses would become even more severe as the grade of tungsten concentrate changed in the direction of higher molybdenum contents. Even when molybdenum contents in the caustic leach liquor are only 0.02 to 0.05 gpl, 1% to 2% of tungsten in the solution can be lost in the molybdenum trisulfide cake.

The tungsten values in the molybdenum trisulfide cakes cannot readily be recovered by direct recycling of the cakes back into the plant process, since these cakes represent the only method for removing molybdenum values from the feed to the plant. If the cakes are recycled for tungsten recovery without first removing all or most of the molybdenum, molybdenum levels in process solutions will increase steadily, and ultimately will lower ammonium paratungstate (APT) product quality. In the past these cakes have been treated several ways, but the two most common methods have been either to roast the trisulfide cake to produce a low grade oxide containing both tungsten and molybdenum for sale to the steel industry, or to dispose of the cake in a landfill. In the latter case, the tungsten values are completely lost, while in the former case the tungsten is sold for significantly less than if it were sold as APT.

It becomes apparent therefor, that an improved treatment scheme is required in order to recover tungsten from precipitates. It is to the provision of such a treatment scheme that the present invention is directed.

BRIEF SUMMARY OF THE INVENTION

Molybdenum trisulfide cake precipitated from the leach solution resulting from caustic leaching or sodium carbonate leaching of a tungsten ore is dissolved in a dilute caustic solution containing between about 5 and about 6 moles of sodium hydroxide for each mole of contained tungsten and molybdenum to give a leach solution containing almost all of the tungsten, most of the molybdenum and other metals such as arsenic in this cake. Impurities such as silica, copper and iron remain in the caustic digestion residue and can be discarded. Tungsten is then recovered from the caustic liquor. This may be done by adding sulfide in stoichiometric excess and adjusting the pH to the range of 2 to 3 to precipitate a second generation molybdenum trisulfide cake leaving most of the tungsten in solution suitable for recovery by recycle or solvent extraction. The MoS₃ cake will contain some tungsten, but overall tungsten recovery will exceed 90%. The cake can be discarded or reprocessed. Alternatively, tungsten is recovered by adding sulfide and adjusting the solution pH between about 7 and about 8 to form thiomolybdate, thioarsenate and thioarsenite species. A source of calcium ions is then added to precipitate essentially all the tungsten as synthetic scheelite (CaWO₄) while the thio-species remain in solution. The slurry is filtered and washed to recover the tungsten in a form suitable for recycle to caustic digestion. The filtrate is acidified to precipitate the thio-species as sulfides which are essentially free of tungsten. The sulfide cake can be treated for molybdenum recovery or discarded.

DETAILED DESCRIPTION OF THE INVENTION

A. Caustic Dissolution to Solubilize Tungsten and Molybdenum (1) The feed cakes are carefully assayed for tungsten (WO₃) and molybdenum. Additional assays such as sulfur and arsenic may be helpful but are not required. The cakes should contain molybdenum primarily as molybdenum trisulfide or oxysulfide while tungsten will be present as tungstic acid with very minor amounts of tungsten sulfide. The form of the tungsten allows efficient recovery using a dilute caustic solution.

(2) Based on the assay values, the cakes are leached with about 5 moles of NaOH per mole of tungsten plus molybdenum contained in the cake. The stoichiometry of the reaction is shown below for MoS₃.

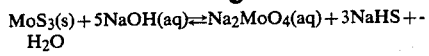

If less than 5 moles of NaOH are used, $WO_3$ extraction usually is less than 95 percent. If greater than 5 moles of NaOH are used, the caustic is wasted and eventually is neutralized to make $Na_2SO_4$.

(3) The slurry density is adjusted to obtain a leach filtrate containing 60 to 80 g/l $WO_3$, assuming greater than 95 percent tungsten dissolution.

(4) Leaching times of 24 to 48 hours can be used if 25° C. is used as the leach reaction temperature. Leaching time can be decreased to 2 to 6 hours if 60° C. is used.

(5) At the end of the digestion cycle, typically greater than 95 percent tungsten dissolution will be achieved, with molybdenum dissolution in the range of 60 to 90 percent. Other impurities such as iron, copper, and silica remain unreacted and stay with the digestion residue.

(6) After filtration and washing, the leach filtrate will typically contain 40 to 80 g/l $WO_3$, 1 to 20 g/l Mo and 0.5 to 10 g/l As. Sulfide concentration will vary, but may be about 5 to 25 g/l $S^=$. Solution pH will be about 10 to 13.5 and more typically about 12.5 to 13.5, depending on the free caustic level.

B. Treatment Of The Resulting Filtrate For Tungsten Recovery

1. Precipitation of a Second Generation Molybdenum Trisulfide Cake (a) Additional sulfide, if required, is added to the solution to obtain 1 to 3 moles of sulfide per mole of molybdenum.

(b) The filtrate is then acidified to form a second generation molybdenum trisulfide cake. The process of acidification is described in U.S. Pat. No. 4,303,623.

(c) The second generation molybdenum trisulfide cake should contain less than 5 to 10 percent of the tungsten from the caustic leach liquor. Therefore, overall tungsten recovery from the initial molybdenum trisulfide cake should be on the order of 90 to 95 percent.

(d) The second generation molybdenum trisulfide cake can be reprocessed, if desired, or can be discarded.

(e) The tungsten-containing solution can be recycled to a suitable place in the plant process.

2. Precipitation of Synthetic Scheelite (a) Additional sulfide is added, if necessary, to obtain about 2 to 3 g/l excess of the amount to have 4 moles of sulfide per mole of molybdenum and arsenic.

(b) The filtrate is then acidified to pH 7 to 8 to form thiomolybdate, thioarsenate, and thioarsenite. The reaction is carried out at about 60° to 80° C., although higher or lower temperatures can be used.

(c) After about a 1-hour holding time, calcium chloride is added to precipitate $CaWO_4$. The calcium addition is based on the amount to form $CaWO_4$ plus about a 3 to 6 g/l $Ca++$ excess. During calcium addition, the pH of the solution is not allowed to drop below 7 or rise above 8. If the pH drops below 7, $MoS_3$ will precipitate and if the pH rises above 8, $CaMoO_4$ will precipitate.

(d) After a holding time of from 2 to 4 hours, the slurry is filtered to recover tungsten as $CaWO_4$. Greater than 98 percent of the tungsten will report to the synthetic scheelite, $CaWO_4$. Molybdenum and arsenic precipitation to this solid will be less than 15 percent, and under optimum conditions, less than about 10 percent.

(e) The solid $CaWO_4$ is then recycled to the front end of the process where tungsten is solubilized during alkaline digestion. The filtrate containing the thio-species is acidified to precipitate a molybdenum trisulfide cake free of tungsten. Depending on the arsenic content of the cake, it can be treated for molybdenum recovery by roasting or it can be discarded.

The overall process is easy to implement and requires minimum reagent consumption for recovery of tungsten values.

Examples will now be given.

EXAMPLE 1

This example illustrates the effects of time, temperature and caustic addition on the dissolution of tungsten and molybdenum from molybdenum trisulfide cakes. Results are summarized in the following table for several different feeds. The results of the first three tests show that increasing the mole ratio of NaOH to $WO_3$ plus Mo increased dissolution of tungsten and molybdenum when Feed A was leached. The next four tests, using Feed B, show that reaction times of 24 hours at 25° C. or 2 hours at 60° C. are effective for dissolution of tungsten and molybdenum using 4 to 6.5 moles of NaOH. The last three tests show that the leaching conditions chosen are effective for three other feed sources (Feeds C, D and E).

TABLE 1

| | Caustic Dissolution of MoS₃ Cakes | | | | | | |
|---|---|---|---|---|---|---|---|
| | Feed Assay, % | | Leach | Leach | NaOH/ | Initial Dissolution, % | | |
| Feed | $WO_3$ | Mo | Temp, C.° | Time, Hrs | $WO_3$ + Mo | NaOH, g/l | $WO_3$ | Mo |
| A | 10.3 | 3.98 | 25 | 2 | 2 | 30 | 88.2 | 39.2 |
| A | 10.3 | 3.98 | 25 | 2 | 3 | 45 | 94.4 | 63.8 |
| A | 10.3 | 3.98 | 25 | 2 | 4 | 60 | 95.9 | 82.0 |
| B | 38.2 | 2.25 | 25 | 24 | 3.2 | 30 | 95.0 | 41.4 |
| B | 38.2 | 2.25 | 25 | 24 | 6.5 | 60 | 99.4 | 69.4 |
| B | 38.2 | 2.25 | 60 | 2 | 2 | 30 | 93.8 | 26.9 |
| B | 38.2 | 2.25 | 60 | 2 | 4 | 60 | 98.8 | 64.8 |
| C | 20.4 | 1.51 | 25 | 24 | 6 | 100 | 99.4 | 96.7 |
| D | 14.2 | 2.16 | 25 | 24 | 6 | 110 | 99.5 | 97.6 |
| E | 36.9 | 2.20 | 60 | 2 | 6 | 42 | 99.5 | 97.0 |

EXAMPLE 2

This example illustrates the treatment of filtrate produced from caustic digestion. Results are summarized in Table 2. Filtrates obtained from caustic dissolution of Feeds C and D were treated with varying amounts of sulfide prior to rapid acidification to pH 2.5 as described in U.S. Pat. No. 4,303,623. The results show that addition of 1 to 3 moles of sulfide per mole of molybdenum generally improves molybdenum precipitation and results in less precipitation of tungsten.

TABLE 2

Precipitation of 2nd Generation MoS₃ From Caustic Digestion Liquor

| Feed | Initial Solution Mo, g/l | Initial Solution WO₃, g/l | Additional Sulfide Mole S⁼/mole Mo | Filtrate Mo, ppm | Precipitated % WO₃ | Precipitated % Mo |
|---|---|---|---|---|---|---|
| C | 5.58 | 75.1 | 0 | 118 | 7.0 | 97.7 |
| C | 5.58 | 75.1 | 1 | 114 | 2.3 | 97.5 |
| C | 5.58 | 75.1 | 3 | 207 | 1.5 | 95.3 |
| D | 13.9 | 90.2 | 0 | 1987 | 8.0 | 82.7 |
| D | 13.9 | 90.2 | 1 | 227 | 5.5 | 97.6 |
| D | 13.9 | 90.2 | 3 | 20 | 6.9 | 99.8 |

EXAMPLE 3

In this example, molybdenum trisulfide precipitation cake (Feed B, 38.2% WO₃ and 2.25% Mo) was digested with caustic for 2.5 hours at 80° C. using 9.5 moles of NaOH per mole of WO₃ and Mo. The slurry was filtered and the filtrate was acidified to pH 2.5 to obtain a second generation molybdenum trisulfide cake. The following table shows a distribution of elements between the various products. Greater than 98 percent of the tungsten reported to the final filtrate while almost 96 percent of the molybdenum reported to the second generation MoS₃ cake. Most of the copper, silica and zinc remained in the caustic digestion residue.

TABLE 3

Distribution of Species During Caustic Dissolution and Reprecipitation of MoS₃ Cake

| SAMPLE | WO₃ | Mo | Stot.[b] | Cu | SiO₂ | Zn | As |
|---|---|---|---|---|---|---|---|
| Feed, (209 g)[a] | 38.2% (80.5 g) | 2.25% (4.7 g) | 33.5% (70 g) | 5.18% (10.8 g) | 1.8% (3.9 g) | 66 ppm (0.014 g) | 250 ppm (0.05 g) |
| Caustic Residue, (49 g) | 0.83% (0.4 g) | 0.23% (0.1 g) | 12.6% (6.2 g) | 22.0% (10.8 g) | 18.0% (8.8 g) | 270 ppm (0.013 g) | 22 ppm (0.001 g) |
| 2nd Generation MoS₃ Cake, (49 g) | 1.86% (0.9 g) | 7.06% (3.46 g) | 90.0% (3.5 g) | 0.15% (0.07 g) | 0.06% (0.03 g) | 10 ppm (0.0005 g) | 730 ppm (0.04 g) |
| Final Filtrate, (1420 ml) | 55.8 g/l (79.2 g) | 32 ppm (0.05 g) | — | — | — | — | 14 ppm |

[a]Weights are given on a dry basis.
[b]No sulfide was added prior to acidification of caustic filtrate.

EXAMPLE 4

A test was conducted using solution prepared from reagents to contain 80 g/l WO₃ (as Na₂WO₄) and 10 g/l Mo (as Na₂MoO₄). Sulfide was added at the rate of 4 moles S= per mole of molybdenum and the solution was heated to 80° C. The solution was acidified to pH 7 and calcium chloride was added to precipitate CaWO₄. After 4 hours the slurry was filtered and the solids were washed. The solids contained 55 percent WO₃ and 1.2 percent molybdenum which indicated that 99 percent of the tungsten and less than 10 percent of the molybdenum had precipitated.

EXAMPLE 5

A series of tests was repeated similarly to that reported in Example 4, except that the pH of the solution at the time of the calcium chloride addition was varied. Results are summarized in the following table and indicate that pH 7 to 8 is the optimum pH to add calcium chloride. Below pH 7, molybdenum precipitates as MoS₃ while above pH 8, molybdenum precipitates as CaMoO₄.

TABLE 4

Effect of pH on Precipitation of CaWo₄ from Solution Containing Molybdenum

| Test No. | pH of Solution At Time of Calcium Chloride Addition | Precipitated WO₃ | Precipitated Mo |
|---|---|---|---|
| 1 | 6 | 86.3 | 82.6 |
| 2 | 7 | 93.0 | 16.2 |
| 3 | 7.5 | 98.0 | 5.4 |
| 4 | 8 | 98.0 | 14.0 |
| 5 | 9 | 98.8 | 34.5 |
| 6 | 10 | 99.4 | 70.6 |

The soluble sulfide used in the process can be sodium sulfide, sodium hydrogen sulfide, potassium sulfide, potassium hydrosulfide, ammonium sulfide, and hydrogen sulfide. The calcium ion source preferably is calcium chloride.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. The process for recovering tungsten from a molybdenum trisulfide precipitate obtained by sulfide precipitation from an aqueous leach solution containing tungsten and molybdenum values with arsenic as an impurity, said precipitate containing co-precipitated tungsten and arsenic which comprises dissolving essentially all of the tungsten and molybdenum values contained in said precipitate using as a solvent an aqueous caustic solution containing at least about 5 but not more than 6 moles of sodium hydroxide per mole of tungsten plus molybdenum contained in said precipitate, separating insoluble material from the resulting leach solution, controlling the sulfide content of said leach solution to be about 4 moles per mole of molybdenum plus arsenic, controlling the solution pH within the range of about 7 to about 8 to form the thiomolybdate species along with an impurity species from the group consisting of thioarsenate and thioarsenite, and while said solution pH is maintained between about 7 and about 8, adding calcium ions to precipitate said tungsten as synthetic scheelite, and separating said scheelite precipitate from said solution containing molybdenum.

2. A process in accordance with claim 1 wherein said sulfide is selected from the group consisting of sodium sulfide, sodium hydrogen sulfide, potassium sulfide, potassium hydrogen sulfide, ammonium sulfide and hydrogen sulfide.

3. A process in accordance with claim 1 wherein said leach solution is at a temperature of about 60° to about 80° C. at the time of said sulfide addition.

4. A process in accordance with claim 4 wherein said calcium ions are added in stoichiometric amount to form $CaWO_4$ with about 3 to about 6 gpl $Ca++$ in excess.

* * * * *